Aug. 12, 1930.   J. H. ROBERTSON   1,772,593
FRICTION GEARING
Filed July 7, 1928   3 Sheets-Sheet 2

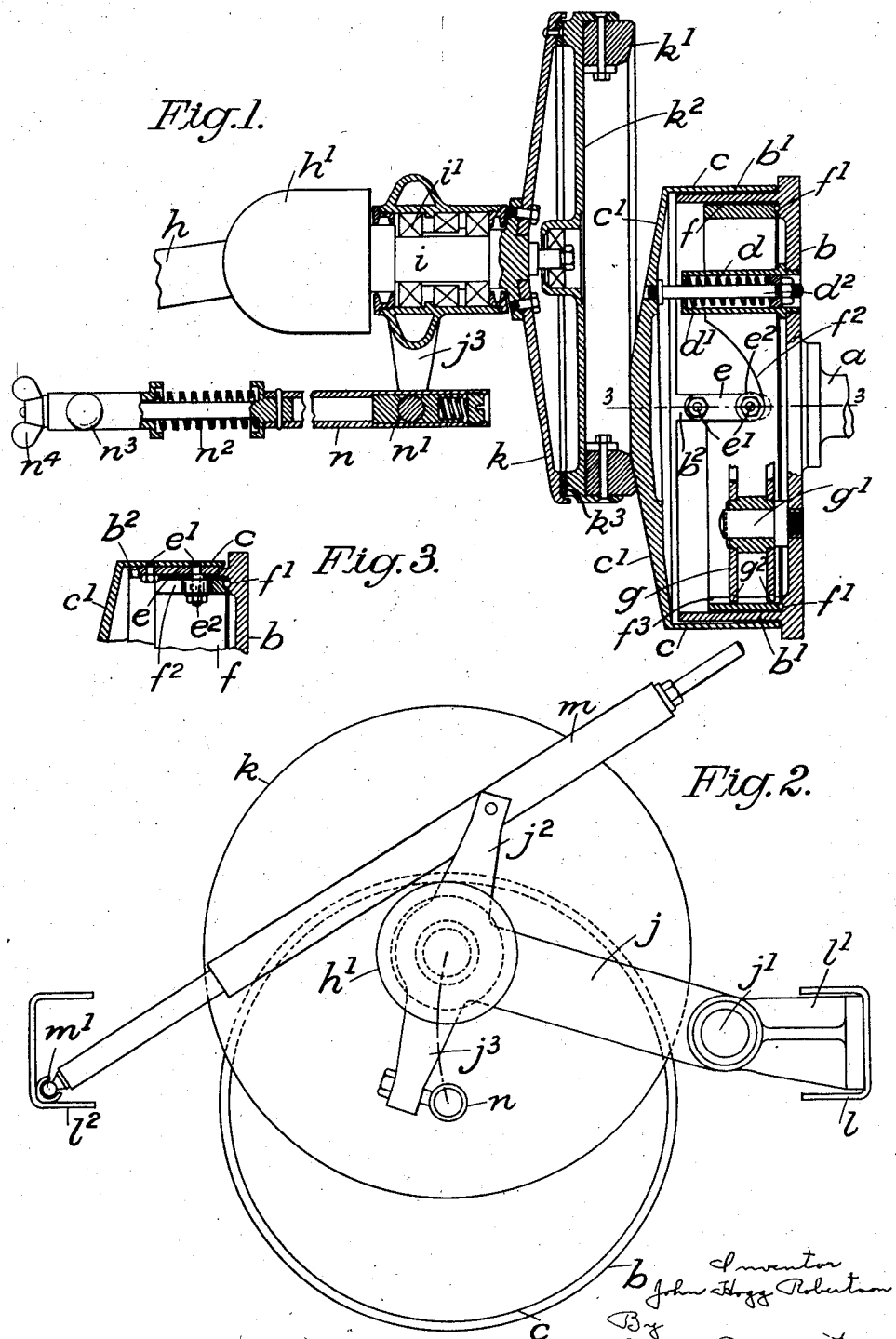

Inventor
John Hogg Robertson
By
Pennie, Davis, Marvin Edmonds
Attorneys

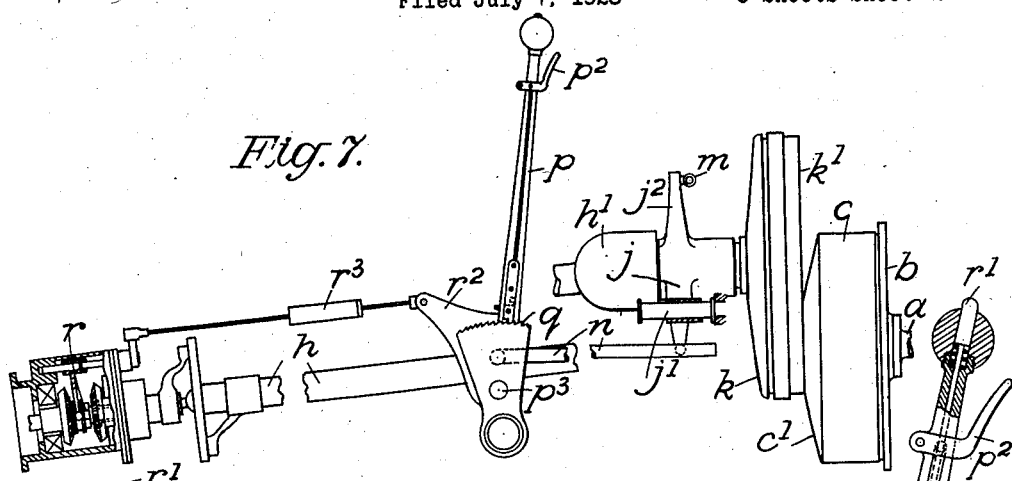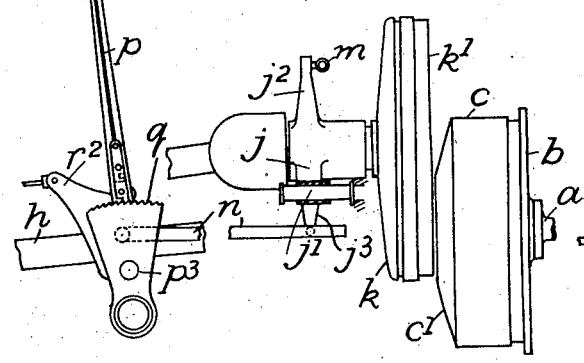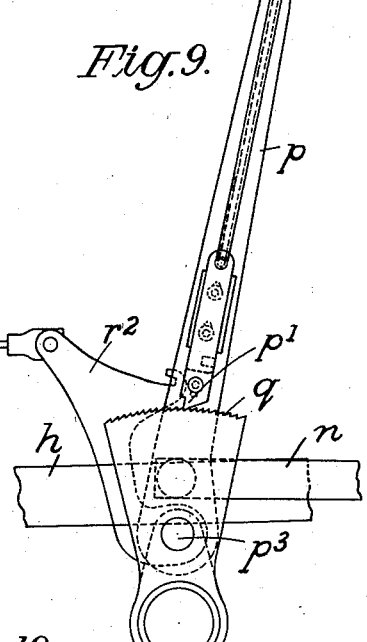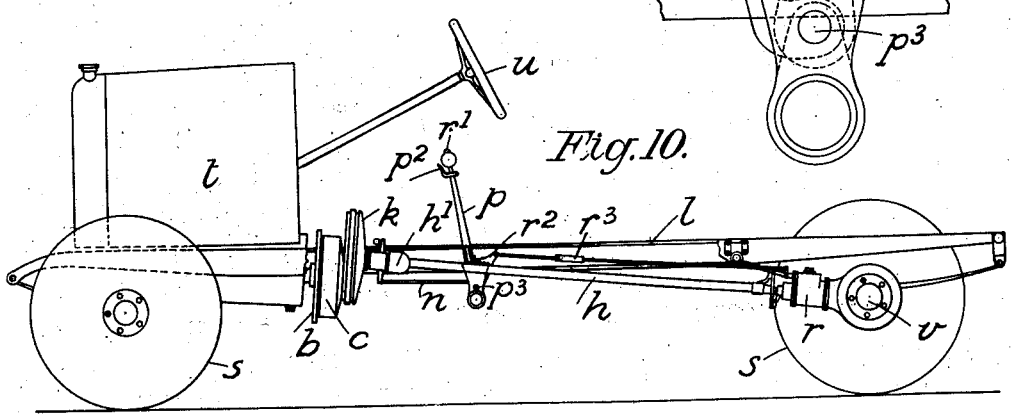

Patented Aug. 12, 1930

1,772,593

UNITED STATES PATENT OFFICE

JOHN HOGG ROBERTSON, OF LONDON, ENGLAND

FRICTION GEARING

Application filed July 7, 1928, Serial No. 291,122, and in Great Britain April 10, 1928.

This invention relates to friction gearing of the variable type, in which the ratio of transmission can be varied between two extreme values by displacement of one of the members relatively to the other, and more particularly to that type of friction gearing in which one extreme value of the transmission ratio is obtained by direct engagement of the two members in the manner of a friction clutch, the variations from this extreme value towards the other extreme being obtained by displacing one member laterally so that the frictional engagement takes place by contact at points of limited areas of which the respective radial distances from the axes of the two members are unequal.

The invention has for its object to provide an improved continuously variable friction gearing of the above type, in which the axes of the two members remain always substantially parallel, the displaceable member being supported by a radius arm controlled by a spring or the like and adapted to swing around an axis to one side of and parallel to the axes of the two members, the movement of the radius arm causing the axis of the displaceable member to travel along a circular arc approximating to a radius of the other member.

The invention has also for an object to provide improved means for controlling the position of the laterally displaceable member, preferably in an automatic manner and in accordance with the speed and torque of the two members, the laterally displaceable member being caused to swing around the axis of its radius arm by relative axial displacement of one or both of the two members, the latter having conical engaging surfaces so that the axial advance of one member towards the other tends to bring them into the coaxial position whereas the contrary movement allows the laterally displaceable member to move towards the eccentric position. The relative axial displacement of the two members may be produced automatically or at the will of the operator, or again by a combination of one member of which the axial displacement is controlled automatically and a second member of which the axial displacement is controlled by the operator.

The invention has the further object of providing an arrangement of parts whereby control of the position of the displaceable member is obtained automatically by causing the torque acting through that member to react upon the spring-controlled radius arm so as to increase or decrease the lateral displacement of the displaceable member. In conjunction therewith, the invention comprises the provision of means for the axial displacement of the other member, the advance or withdrawal of which further reacts upon the spring-controlled radius arm, said axial displacement being determined by a governor or equivalent device in accordance with the speed of said other member.

The invention is hereafter described with reference to the accompanying drawings, which show a form of construction suitable for a light motor vehicle as illustrating one embodiment of the invention. In these drawings, Figure 1 is a longitudinal sectional view of the driving and driven members, the latter being displaced laterally upwards from the axis of the driving member.

Figure 2 is an end view, as seen from the left of Figure 1.

Figure 3 is a detail seen in section on the line 3—3 of Figure 1.

Figure 7 illustrates the arrangement of a manual control of the variable gearing, together with a reversing gear.

Figure 8 is a partial view corresponding to Figure 7, but representing the position of the parts when the manual control withdraws the driven member from contact with the driving member.

Figure 9 is a view of the manual control lever on a larger scale.

Figure 10 is a conventional representation of an automobile fitted with a variable frictional gearing according to the present invention.

Referring to Figures 1 to 5, there is mounted upon the engine shaft $a$ and in place of the usual flywheel, a driving member in the form of a hollow cylindrical box $b$ having a cover $c$ including a coned end disc $c^1$, this cover being slidable axially upon the exterior of the box $b$, but normally held back towards the latter by springs $d$ enclosed in thimbles $d^1$ screwed to the back of the box, and plunger rods $d^2$ screwed to the cover disc $c^1$. The rim $b^1$ of the box is slotted parallel to its axis at two or more points around its circumference, each of these slots $b^2$ receiving a driving key $e$ which is secured upon the internal periphery of the cover $c$ by a pair of studs $e^1$, projecting radially inwards from the cover; one stud of each pair is fitted with a roller $e^2$. Inside the box there is mounted a rotatable cage in the form of a cylindrical ring $f$, which is supported at one edge by a ball thrust race $f^1$ while the opposite edge is notched or cut away to form cams $f^2$ at positions corresponding to the spacing of the slots $b^2$ and roller-fitted studs $e^1$; the rollers $e^2$ engage with the cam surfaces $f^2$, so that rotation of the cage ring $f$ in one direction will cause the cover $c$ to travel axially forward from the box $b$, against the action of the retaining springs $d$, the rotation of the cage being produced by a governor which tends to advance the cover in proportion as the speed of rotation increases. The governor comprises weighted levers $g$ pivoted at $g^1$ upon the back of the box $b$ and having toothed segments $g^2$ gearing with part circular racks $f^3$ on the interior of the cage $f$, as described in my concurrent patent application Serial No. 291,121.

The shaft $h$ transmitting the drive from the friction gearing has its forward end connected by a universal joint $h^1$ to the driven member of the friction gear, provision being made for axial movement, for example by employing a plunging universal joint of the known kind.

The driven member of the friction gear is mounted upon a shaft $i$ supported in suitable bearings $i^1$ at the free end of a radius arm $j$, the rear end of this shaft $i$ carrying the universal joint $h^1$, and the forward end of this shaft $i$ carrying the driven member itself, which is constructed in the form of a wheel $k$ having an annular friction face $k^1$ coned to the same angle as the disc face $c^1$ of the slidable cover $c$ upon the driving member. The driven member may include (as shown) an intermediate disc $k^2$ carrying on one side the friction face $k^1$ and engaging on its other side with a second friction face $k^3$, the materials employed for the respective pairs of contacting faces being of different friction coefficients, as described in my concurrent patent application Serial No. 291,123.

Figure 4:
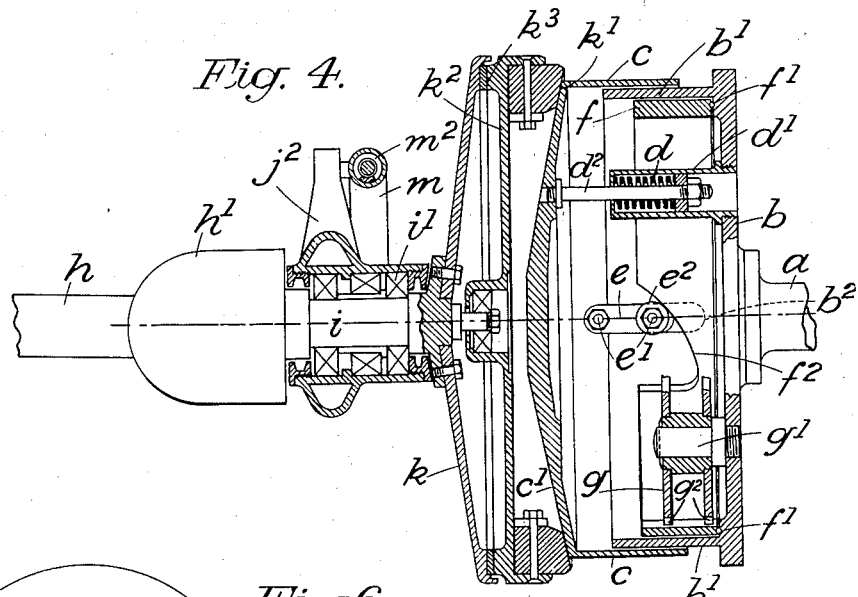
Figures 4 and 5 are views corresponding to Figures 1 and 2, but representing the positions of the parts when the two members become coaxial.
Figure 5:
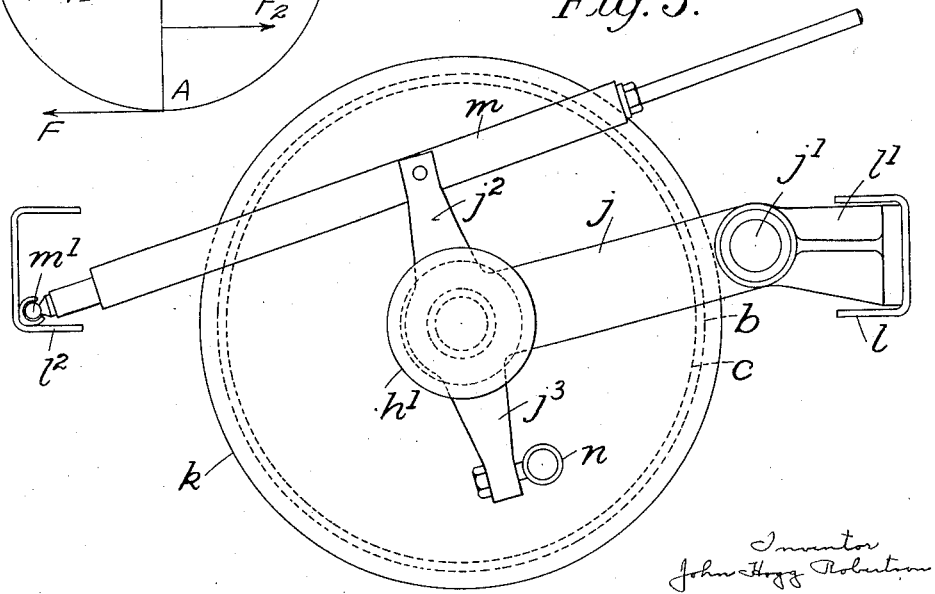

The radius arm $j$ may be of length somewhat greater than the radius of the driving and driven members, as shown in Figure 2, so that it swings around a center $j^1$ to one side of the two members, the shaft $i$ of the driven member being thus movable laterally of the driving member along a part-circular path from a position near one edge of the latter (Figures 1 and 2) to a position coaxial therewith (Figures 4 and 5). For convenience, the path of the laterally displaceable driven member $k$ may be made to follow a curve (indicated by chain lines in Figures 2 and 5) approximating to a vertical radius of the driving member, the pivot $j^1$ of the radius arm being provided by a pin carried by a bracket $l^1$ upon one of the side members $l$ of the vehicle frame and the driven member rising gradually as it is displaced from the coaxial position (shown in Figure 5) into the successive positions of indirect drive until it reaches the extreme position shown in Figures 1 and 2.

The radius arm $j$ is controlled by a telescopic spring link $m$, which acts between a ball and socket abutment $m^1$ upon the opposite side member $l^2$ of the vehicle frame and an upward extension $j^2$ of the radius arm, the spring $m^2$ enclosed in the telescopic link acting in compression so as to tend to raise the radius arm $j$ and thereby to displace the driven member $k$ away from its coaxial position (Figures 4 and 5) in line with the driving shaft $a$ and member $b$, towards the indirect drive position shown in Figures 1 and 2.

The radius arm $j$ is preferably a T-shape, having a lower extension $j^3$ on the side opposite extension $j^2$, to which lower extension there is connected for example by means of a ball joint $n^1$, an abutment such as a thrust rod $n$ lying beside or approximately parallel to the driven shaft $h$ and more or less in line with the driving shaft $a$, which abutment enables the shaft $i$ to resist the pressure acting between the driving and driven members. The other end of the thrust rod $n$ may be provided, as shown on the left of Figure 1, with a spring buffer device $n^2$ and a ball-jointed member $n^3$ which takes the thrust, the initial compression of the spring being adjustable by a nut $n^4$.

With the parts at rest, or with the engine running at low speed, no effective contact takes place between the coned driving disc $c^1$ and the driven wheel $k$ but as soon as the engine is brought up to a predetermined speed by depressing an accelerator pedal or the like, the governor device $g$ $g^1$ $g^2$ rotates the cage ring $f$ inside the box $b$ and advances the slidable cover $c$ so as to bring the coned disc $c^1$ into operative engagement with the annular face $k^1$ of the driven member in the position of Figures 1 and 2. When the engagement takes place, the axial force exerted on the slidable disc $c^1$ by the governor device is conveyed to the friction surfaces, motion being transmitted to the driven member $k$ as soon as this force produces a sufficient torque to overcome the resistance to movement; the two members then revolve in the same direction but eccentrically to one another and at different speeds, the gear reduction being proportional to the respective radii from the point (or limited area) of contact.

If the speed of the engine continues to increase, the governor device pushes the slidable cover $c$ further forward, which causes the driven member $k$ to move towards the coaxial position, the radius arm $j$ being rotated in opposition to its controlling spring link $m$; the driven member $k$ is thus brought more and more nearly concentric with the driving member, with a resultant gradual raising of the gear ratio, until the two members finally attain the coaxial position shown in Figures 4 and 5, when the friction faces make contact for the whole of their circumferences, giving a direct drive from the engine to the propeller shaft. The effect of the buffer device $n^2$ is to limit the pressure acting between the driving cone and driven disc, and further to reduce this pressure automatically as the gear is raised, the movement of the wheel $k$ towards the coaxial position allowing the spring buffer to relax as the wheel travels down the cone, the radius arm $j$ being slidable along its pivot $j^1$ as hereafter described.

If the speed of the engine decreases for any reason, the governor device will allow the coned disc $c^1$ to recede from the driven member, the spring-controlled radius arm $j$ then displacing the driven member $k$ laterally upwards to maintain the frictional engagement but at a lower gear ratio.

The spring control by the link $m$ may be arranged to exert a maximum effect when in the lowest gear position and to have a diminished effect in the higher gear positions, by so disposing the spring link $m$ that it forms a kind of toggle device in combination with the extension $j^2$ of the radius arm, the leverage of the spring link decreasing as the driven member approaches the direct drive position, Figure 5.

In addition to the automatic variation of gear according to the engine speed, there is an additional or complementary variation according to the resistance to motion, because the force transmitted to the driven member $k$ at the point of frictional engagement in the positions of indirect drive reacts upon the radius arm $j$, producing a couple which tends to turn the arm about its pivot.

Figure 6:
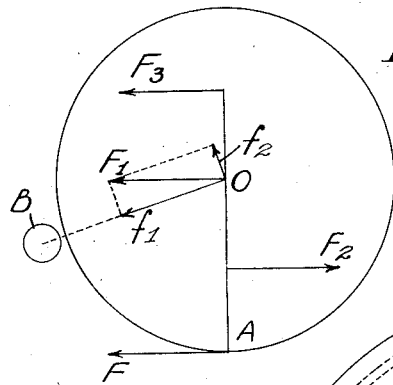
Figure 6 is a diagram explaining the automatic control of the displaceable member by the torque acting upon it.

Figure 6 represents the action of the principal forces involved, the diagram being arranged as viewed from the driving side, that is, looking in the opposite direction to Figures 2 and 5.

O is the center of the driven member, in its laterally displaced position;

A is the center of the area of contact between the driven member and the driving disc;

B represents the pivot ($j^1$) of the radius arm;

F is the tangential driving force acting upon the driven member at the point A, and exerting a torque around the point O (shaft $i$) which torque is balanced by an equal and opposite couple due to the resistance to movement of the driven shaft $h$. This opposing couple or torque reaction can be represented by two forces $F_2$ and $F_3$, each equal to F and acting at half the radial distance OA.

$F_1$ is the resultant of the three forces F $F_2$ $F_3$, this resultant being equal to F and acting parallel to the latter but through the center O. Resolving this force $F_1$ into its components, one $f_1$ along the radius arm $j$ in the direction OB, the other $f_2$ at right angles thereto, the component $f_2$ produces a couple around the point O tending to swing the radius arm $j$ in a counter-clockwise direction, as viewed in Figure 6, and to maintain the driven member in the position of upward lateral displacement. The component $f^2$ is equal to the resultant $F_1$ (that is, equal to the force F) multiplied by the cosine of the angle ($\alpha$) between $F_1$ and $f_2$, being therefore a maximum when the driven member is at its extreme indirect drive position. This component due to the torque reaction assists the spring control by the link $m$, both forces tending to keep the gear in the lowest ratio. Consequently the variation of gear is in this case controlled automatically partly by the spring link $m$ and partly by the relation between the two opposing factors of engine-speed and resistance-torque, and for the same engine-speed the gear-ratio will be higher on the level or when running downhill than when climbing uphill.

Means are also provided for an independent regulation of the control, operated by the driver, this independent manual control serving to displace the driven member $k$ axially towards or away from the driving disc, so as to provide a higher or a lower ratio according to circumstances, by the operation of a hand lever $p$ connected to the rear end of the thrust rod $n$; the pivot $j^1$ of the radius arm is for this reason provided by a spindle (see Figure 7) lying parallel to the engine shaft $a$ the radius arm $j$ being slidable along that spindle $j^1$, as well as being adapted to swing upon the spindle as a center. When the manual control is operated, as shown in Figure 8, to withdraw the driven member $k$ wholly away from the driving disc, no driving engagement can take place, even when the disc is advanced to its full extent by the governor mechanism. At intermediate positions of the manual control, the driving engagement will take place at higher engine speeds than in normal operation; thus the operator is enabled to regulate the automatic working of the variable gear to suit the particular conditions and to take advantage of his personal skill. Similarly the manual control can be operated to advance the driven member axially towards the driving disc, the engagement then taking place at lower engine speeds than in the normal automatic operation.

The hand lever $p$ (see Figure 9) is detained in its position after adjustment, by means of a toothed quadrant $g$ engaged by a tooth or pawl $p^1$ upon the lever, the latter having a trigger $p^2$ or like device for releasing the pawl $p^1$ when it is desired to alter the position of adjustment. The same operating lever is also used to obtain a free position independently of the accelerator or like control, for example, when it is required to obtain a reverse drive by means of the supplementary gear box $r$ (Figure 7), while the lever $p$ maintains the friction gear in the free position, as in Figure 8; the depression of a catch $r^1$ upon the hand lever $p$ engages a rocking piece $r^2$ mounted on the same pivot $p^3$ as the lever, so that by returning the hand-lever $p$ towards its normal position, tension is applied to a spring link $r^3$ which engages the reverse gear as soon as the teeth or jaws of the engaging members come into line. After reversing, the hand-lever $p$ must be operated again to obtain the free position before the reverse gear can be disengaged.

With this arrangement, the invention provides a continuously variable friction gearing which is automatic in operation under normal running conditions, but can be regulated independently by hand at the will of the driver, and in addition includes reversing mechanism controlled entirely by the same manual regulating means.

Such an arrangement is particularly well suited for light automobiles; I have illustrated in Figure 10 a vehicle comprising a frame $l$, wheels $s$, engine $t$ and steering gear $u$, the drive from the shaft $h$ being transmitted through the reverse gear box $r$ to the back axle $v$ in any suitable way, for example by bevel gearing as well known in the art.

It will be understood that the invention is not limited to the particular embodiment described, but that it may be applied to variable gearing for other classes of machinery, especially where an automatic variation is required within limits which can be adjusted by hand or otherwise according to the conditions of operation.

What I claim is:—

1. A variable friction gearing, comprising driving and driven members, said members having their axes of rotation substantially parallel, said driving member including a conical disc adapted to contact with said driven member, means for advancing said conical disc axially into contact with said driven member, a radius arm supporting said driven member, said radius arm permitting lateral displacement of said driven member relatively to said driving member, the pressure between said conical disc and said driven member tending to swing said radius arm in one angular direction to bring said driven member coaxial with said conical disc, and spring operated means tending to swing said radius arm in the opposite angular direction, the angular position of said radius arm and the amount of lateral displacement of said driven member varying automatically with the relation between the pressure acting between said conical disc and said driven member and the force exerted by said means tending to swing said radius arm in the opposite angular direction.

2. A variable friction gearing, comprising driving and driven members, said members having their axes of rotation substantially parallel, said driving member including a conical disc adapted to contact with said driven member, means for advancing said conical disc axially into contact with said driven member, a radius arm supporting said driven member, said radius arm permitting lateral displacement of said driven member relatively to said driving member, speed controlled means for exerting pressure between said conical disc and said driven member, said pressure tending to swing said radius arm in one angular direction to bring said driven member coaxial with said conical disc, and means tending to swing said radius arm in the opposite angular direction to bring said driven member to an eccentric position.

3. A variable friction gearing, comprising driving and driven members, said members having their axes of rotation substantially parallel, said driving member including a conical disc, means governed by the speed of said driving member for advancing said conical disc axially into contact with said driven member, a radius arm supporting said driven member, said radius arm permitting lateral displacement of said driven member relatively to said driving member, the pressure between said conical disc and said driven member tending to swing said radius arm in one angular direction, and the fulcrum of said radius arm being so disposed relatively to said members that the reaction of the torque acting between said members at the area of contact tends to swing said radius arm in the opposite angular direction.

4. A variable friction gearing, comprising driving and driven members, said members having their axes of rotation substantially parallel, said driving member including a conical disc, means governed by the speed of said driving member for advancing said conical disc axially into contact with said driven member, a radius arm supporting said driven member, said radius arm permitting lateral displacement of said driven member relatively to said driving member, the pressure between said conical disc and said driven member tending to swing said radius arm in one angular direction to bring said driven member coaxial with said conical disc, and the fulcrum of said radius arm being so disposed relatively to said members that the reaction of the torque acting between said members at the area of contact tends to swing said radius arm in the opposite angular direction to bring said driven member to an eccentric position, the angular position of said radius arm and the amount of lateral displacement permitted to the driven member varying with the relation between the pressure acting between said speed-governed conical disc and said driven member and the torque transmitted to said driven member at the area of contact.

5. A variable friction gearing, comprising a driving member, an axially displaceable conical disc forming part of said driving member, governor mechanism tending to displace said conical disc axially according to the speed of said driving member, a driven member having its axis of rotation substantially parallel to that of said driving member, a radius arm supporting said driven member, said radius arm permitting lateral displacement of said driven member relatively to said driving member, said conical disc advancing into contact with said driven member when displaced axially by increased speed of said driving member, the pressure between said members when in contact tending to swing said radius arm in an angular direction to bring said members towards coaxial position, and means tending to swing said radius arm in the opposite angular direction.

6. A variable friction gearing, comprising a driving member, an axially displaceable conical disc forming part of said driving member, governor mechanism tending to displace said conical disc axially according to the speed of said driving member, a driven member having its axis of rotation substantially parallel to that of said driving member, a radius arm supporting said driven member, said radius arm permitting lateral displacement of said driven member relatively to said driving member, said conical disc advancing into contact with said driven member when displaced axially by increased speed of said driving member, the pressure between said members when in contact tending to swing said radius arm in an angular direction to bring said members towards coaxial position, and the fulcrum of said radius arm being so disposed relatively to said members that the reaction of the torque acting between said members at the area of contact tends to swing said radius arm in the opposite angular direction.

7. A variable friction gearing, comprising a driving member, a conical disc forming part of said driving member, means for displacing said conical disc axially in a resilient manner, a driven member having its axis of rotation substantially parallel to that of said driving member, a radius arm supporting said driven member, said radius arm permitting lateral displacement of said driven member relatively to said driving member, a spring link controlling the angular position of said radius arm, and a thrust member connected to said radius arm, said thrust member acting approximately parallel to the axes of said driving and driven members to control the position of said driven member, said conical disc advancing into resilient contact with said driven member when displaced axially, and the pressure between said conical disc and said driven member tending to swing said radius arm in an angular direction against the control of said spring link.

8. A variable friction gearing, comprising driving and driven members, said members having their axes of rotation substantially parallel, said driving member including an axially displaceable conical disc, a radius arm supporting said driven member, said radius arm permitting lateral displacement of said driven member relatively to said driving member, resilient means for controlling the angular position of said radius arm to move said driven member to an eccentric position, spring controlled means for advancing said axially displaceable disc into contact with said driven member, so as to bring said driven member into a position coaxial with said driving member and supplementary means for displacing said driven member axially in the direction of the advance of said axially displaceable disc.

9. A variable friction gearing, comprising a driving member, said driving member including an axially displaceable disc, governor mechanism tending to displace said disc axially according to the speed of said driving member, a driven member having its axis of rotation substantially parallel to that of said driving member, said driven member including a friction ring adapted to contact with said displaceable disc at variable relative eccentricity, a radius arm supporting said driven member, a fulcrum for said radius arm, said radius arm permitting lateral displacement of said driven member relatively to said disc to determine said relative eccentricity, and means tending to swing said radius arm in an angular direction to increase said relative eccentricity, the pressure acting between said disc and said friction ring due to the axial displacement tending to swing said radius arm in the opposite angular direction, and the fulcrum of said radius arm being so disposed relatively to said members that the reaction of the torque acting between said members tends to swing said radius arm in the angular direction to increase said relative eccentricity.

10. A variable friction gearing, comprising driving and driven members, said members having their axes of rotation substantially parallel, automatic means for displacing one of said members laterally of the other member, said other member including an axially displaceable disc, automatic speed controlled means for displacing said disc axially in relation to said one member, and supplementary manually operated means for displacing said one member axially in relation to said displaceable disc.

11. A variable friction gearing, comprising driving and driven members, said members having their axes of rotation substantially parallel, automatic means for displacing one of said members laterally of the other member, said other member including an axially displaceable disc, automatic means for displacing said disc axially in relation to said one member, and means for withdrawing said one member axially out of contact with said displaceable disc, in combination with alternative gear drives and means for selecting one of said alternative gear drives, said selecting means being operable only while said one member is withdrawn from contact with said displaceable disc.

12. In an automobile, the combination of variable friction gearing comprising driving and driven members, said members having their axes of rotation substantially parallel, means for displacing one of said members laterally of the other of said members, automatic means for exerting pressure between said members, said automatic means being governed by the speed of rotation of said driving member, and the contact between said members taking place at radial distances varying with the amount of their relative eccentricity, a displaceable thrust member acting approximately parallel to the axes of said driving and driven members to support said driven member against the pressure between said members when in contact, said thrust member including a spring buffer device, alternative gear drives included in the transmission from said driven member, means for selecting one of said alternative gear drives, and a manually operated control, said control regulating the action of said thrust member and including supplementary control means for operating said selecting means, said selecting means being operable only while said thrust member is displaced so as no longer to maintain said driving and driven members in contact with one another.

13. In a variable friction gearing, comprising driving and driven members with conical surfaces adapted for frictional driving contact, said members having their axes of rotation substantially parallel, and a radius arm supporting said driven member to permit its lateral displacement to a position eccentric of said driving member, the combination of an axially displaceable disc forming the conical surface of said driving member, and automatic means governed by the speed of its rotation for displacing said disc axially upon said driving member and in relation to said driven member, the pressure acting between said disc and said driven member when in contact tending to swing said radius arm in one angular direction to bring said driven member coaxial with said conical disc, and the reaction of the torque transmitted by said driven member acting to swing said radius arm in the opposite angular direction to bring said driven member to an eccentric position.

14. In a variable friction gearing, comprising driving and driven members with conical surfaces adapted for frictional driving contact, said members having their axes of rotation substantially parallel, and a radius arm supporting said driven member to permit its lateral displacement to a position eccentric of said driving member, the combination of an axially displaceable disc forming the conical surface of said driving member, automatic means for displacing said disc axially upon said driving member and in relation to said driven member, the pressure acting between said disc and said driven member when in contact tending to swing said radius arm in one angular direction to bring said driven member coaxial with said conical disc, and the reaction of the torque transmitted by said driven member acting to swing said radius arm in the opposite angular direction to bring said driven member to an eccentric position, and supplementary manually operated means for displacing said driven member axially away from said conical disc to allow of further angular movement of said radius arm to bring said driven member to a position of greater eccentricity than would normally be the case.

In testimony whereof I hereunto affix my signature.

JOHN HOGG ROBERTSON.